No. 742,486. PATENTED OCT. 27, 1903.
L. PETER.
MOTOR WHEEL.
APPLICATION FILED JAN. 15, 1902.
NO MODEL.

Witnesses:
Henry Thieme
George Barry Jr.

Inventor:
Louis Peter
By attorneys
Brown & Seward

No. 742,486. Patented October 27, 1903.

UNITED STATES PATENT OFFICE.

LOUIS PETER, OF FRANKFORT-ON-THE-MAIN, GERMANY.

MOTOR-WHEEL.

SPECIFICATION forming part of Letters Patent No. 742,486, dated October 27, 1903.

Application filed January 15, 1902. Serial No. 89,825. (No model.)

*To all whom it may concern:*

Be it known that I, LOUIS PETER, a subject of the Emperor of Germany, and a resident of Frankfort-on-the-Main, in the German Empire, have invented a new and useful Improvement in Motor-Wheels and the Like, of which the following is a specification.

The object of this invention, which is applicable both to wheels with pneumatic tires and to those with solid or cushion tires of elastic material, is to afford facility for the mounting of the tire upon and its detachment from the rim of the wheel and to so fasten the tire to the rim that it will be secure against "creeping" or other displacement; and to these ends the improvement consists in the novel construction and combination of the rim and tire hereinafter described and claimed.

Figure 1:
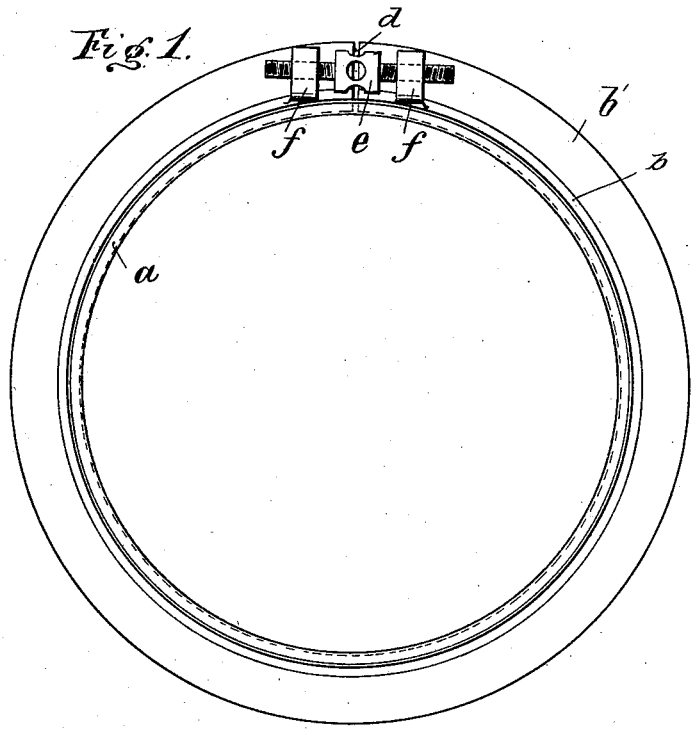
Figure 2:
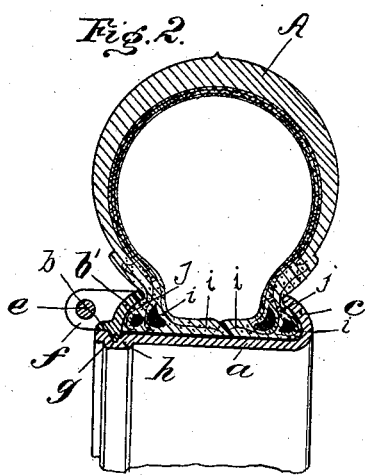
Figure 3:
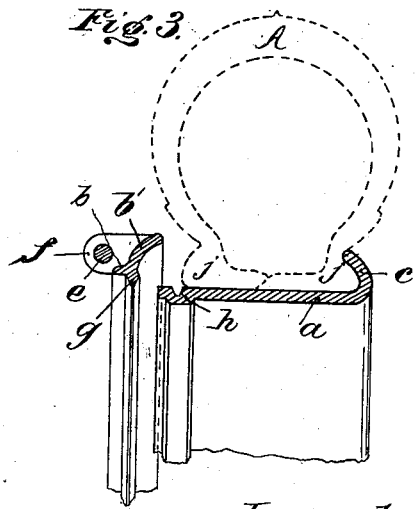

Figure 1 is a side view of a wheel-rim constructed according to my invention; Fig. 2, a transverse section of the rim with the tire mounted and secured thereon; Fig. 3, a view corresponding with Fig. 2, but with the two members of which the rim is composed separated from each other.

A designates the tire, of elastic material, having a cylindrical inner surface or base and having flanges $j$, one on each side, projecting outwardly and laterally from its base.

$a\ c\ b\ b'$ designate the rim, composed of two separable members $a\ c$ and $b\ b'$. The member $a\ c$ comprises an externally-cylindrical portion $a$, which receives the base of the tire, and an inwardly-turned flange $c$, which overlaps one of the external flanges $j$ of the tire. The member $b\ b'$ consists of a ring $b$, a portion of which is cylindrical internally and encircles the cylindrical part $a$ of the rim at one side of the tire. The said member $b\ b'$ has a flange $b'$ overlapping the other external flange $j$ of the tire, and it has also an internal flange or rib $g$, which enters a corresponding recess or groove $h$ in the part $a$ outside of the flange $j$ on its side of the tire. To provide for the placing of the said member $b\ b'$ over the edge of the part $a$ and over the tire-flange, it is divided, as shown at $d$ in Fig. 1, and provided with lugs $f$, which are tapped to receive a right and left hand threaded screw $e$, by the turning of which in one direction the said member is contracted to clamp it upon the tire-flange and clamp the tire to the part $a$. By turning the screw in the opposite direction the said member may be expanded sufficiently to permit its removal sidewise from the member $a\ c$ and the tire and permit the removal of the latter for renewal or repair.

In Fig. 2 the base of the tire and its flanges also are represented as having an internal stiffening $i$, by which they are prevented from stretching and made to give the tire a rigid foot. This stiffening may be a hard rope of suitable fibrous material.

What I claim as my invention is—

1. In wheels for motor-vehicles and the like, the combination of a tire the foot of which is stiffened and has a cylindrical inner surface, a rim member consisting of a fixed cylindrical part fitting tightly within the whole width of said cylindrical surface and provided on one side of the tire with a fixed inwardly-bent flange, a removable rim member applied on said fixed member at the other side of the tire and provided with an inwardly-bent flange, and means for clamping said removable member upon the first-mentioned member and upon the tire.

2. In wheels for motor-vehicles and the like, the combination of a tire the foot of which is stiffened and has laterally and outwardly projecting stiffened flanges and a cylindrical inner surface, a rim member consisting of a fixed cylindrical part fitting tightly into the cylindrical surface of said tire and provided with a fixed inwardly-bent flange, a removable rim member provided with a cylindrical inner surface and with an inwardly-bent flange, and means for fixing said removable member on the first-mentioned member.

3. In wheels for motor-vehicles and the like, the combination of a tire having a cylindrical inner surface and lateral stiffened flanges, a rim member consisting of a fixed cylindrical part fitting tightly into the cylindrical surface of the tire and provided with a fixed inwardly-bent flange and with a recess in its own cylindrical surface, a slit removable part provided with a cylindrical inner surface and an inwardly-bent flange and with a rib fitting into said recess, and means for clamping said removable member over the first-mentioned member.

In testimony whereof I have signed my name to this specification in the presence of two subscribing witnesses.

LOUIS PETER.

Witnesses:
JEAN GRUND,
CARL GRUND.